US012087143B2

(12) United States Patent
Chang

(10) Patent No.: US 12,087,143 B2
(45) Date of Patent: Sep. 10, 2024

(54) NOTIFICATION SYSTEM AND NOTIFICATION METHOD

(71) Applicant: TOYOTA JIDOSHA KABUSHIKI KAISHA, Toyota (JP)

(72) Inventor: Ren-Jye Chang, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/169,980

(22) Filed: Feb. 16, 2023

(65) Prior Publication Data

US 2023/0410624 A1 Dec. 21, 2023

(30) Foreign Application Priority Data

Jun. 21, 2022 (JP) ................................ 2022-099784

(51) Int. Cl.
*G08B 21/02* (2006.01)
*G08G 1/16* (2006.01)

(52) U.S. Cl.
CPC ............ *G08B 21/02* (2013.01); *G08G 1/164* (2013.01)

(58) Field of Classification Search
None
See application file for complete search history.

(56) References Cited

U.S. PATENT DOCUMENTS 10,268,908 B2 * 4/2019 Park ..................... G06V 10/764
10,565,863 B1 * 2/2020 Kim ....................... G08G 1/095
10,672,246 B2 * 6/2020 Aponte Luis ........ G08B 17/125
11,034,347 B2 * 6/2021 Nishimura ............. G08G 1/165
11,128,981 B2 * 9/2021 Feldbeine ............ G08G 1/0141
2016/0140843 A1 * 5/2016 Tosa ........................ H04W 4/40 340/989
2020/0005644 A1 * 1/2020 Ichimaru .......... G08G 1/096775
2020/0175872 A1 * 6/2020 Sakurada ............... G08G 1/166
2020/0273325 A1 * 8/2020 Ueno ...................... G06F 16/00
2020/0346663 A1 * 11/2020 Park ..................... G08G 1/0967
2020/0349843 A1 * 11/2020 Liu ........................ G08G 1/005
2021/0094541 A1 * 4/2021 Kurasawa .............. G06V 10/95
2021/0183244 A1 * 6/2021 Malhan ................... B64F 1/362
2021/0256780 A1 * 8/2021 Geyer ................. G07C 5/0866
(Continued)

FOREIGN PATENT DOCUMENTS

JP 2011-202976 A 10/2011
JP 2012-178127 A 9/2012
(Continued)

*Primary Examiner* — Muhammad Adnan
(74) *Attorney, Agent, or Firm* — Oliff PLC

(57) ABSTRACT

The notification system includes a detection device mounted on a vehicle and one or more portable terminals possessed by each of one or more pedestrians. The detection device detects the position of each pedestrian in a target area at a predetermined relative position to the vehicle, and transmits detection information including position information indicating the detected position to each of the one or more portable terminals. Each portable terminal receives the detection information transmitted from the detection device. When the current position of the portable terminal corresponds to any one of the detected positions indicated by the position information included in the transmitted detection information, each of the portable terminal notifies a pedestrian possessing the portable terminal of the message via the output device.

6 Claims, 9 Drawing Sheets

(56) References Cited

U.S. PATENT DOCUMENTS

| | | | | |
|---|---|---|---|---|
| 2022/0032907 | A1* | 2/2022 | Itoh | G08G 1/096775 |
| 2022/0130237 | A1* | 4/2022 | Umehara | G16Y 20/10 |
| 2023/0249693 | A1* | 8/2023 | Mukundan | G06V 40/193<br>340/425.5 |
| 2023/0292089 | A1* | 9/2023 | Ryan | H04W 4/021 |
| 2023/0410624 | A1* | 12/2023 | Chang | G08B 21/02 |

FOREIGN PATENT DOCUMENTS

| | | | | | |
|---|---|---|---|---|---|
| JP | 2017033460 | A | * | 2/2017 | B60R 21/013 |
| JP | 2019-140424 | A | | 8/2019 | |

* cited by examiner

FIG. 6

821

| OBJECT ID | LATITUDE | LONGITUDE | ACCURACY |
|---|---|---|---|
| 0001 | 35.67113189598247 | 139.74584865367223 | 10 |
| ... | ... | ... | ... |

NOTIFICATION SYSTEM AND NOTIFICATION METHOD

FIELD

The present disclosure relates to a notification system and a notification method for notifying a pedestrian present in the vicinity of a vehicle of a message.

BACKGROUND

By alerting a pedestrian present in the vicinity of the vehicle by sounding a horn or the like, the pedestrian can be alerted, and an accident be more assuredly prevented. It is preferable that the alert be selectively given to a specific pedestrian present in a particular area such as the front of the vehicle.

An attention calling device described in Japanese Unexamined Patent Publication No. 2012-178127 detects a pedestrian in a predetermined area, sends a signal indicating danger to a portable terminal possessed by the detected pedestrian, and the portable terminal notifies the pedestrian of possible danger.

SUMMARY

By selectively sending a danger signal to a portable terminal possessed by a specific pedestrian present in a predetermined area around the vehicle, the pedestrian can be selectively alerted. In order to transmit such a danger signal, it is necessary to detect a pedestrian present in a predetermined area by a sensor such as an ultrasonic sensor or a camera, to identify a portable terminal possessed by the pedestrian, and to transmit a danger signal to the portable terminal. In general, the information of the pedestrian detected by the sensor is not associated with the portable terminal. Therefore, it is difficult to identify the portable terminal to be transmitted from the detected pedestrian information.

It is an object of the present disclosure to provide a notification system to appropriately notify a pedestrian present in a predetermined area around a vehicle of a message.

The gist of the present disclosure is as follows.

(1) A notification system including a detection device mounted on a vehicle and one or more portable terminals possessed by each of one or more pedestrians, wherein
the detection device comprises a processor configured to:
detect a position of each pedestrian in a target area at a predetermined relative position to the vehicle, and
transmit detection information including position information indicating the detected position to each of the one or more portable terminals via a vehicle communication circuit,
each portable terminal comprises a processor configured to:
receive the detection information transmitted from the detection device via a portable communication circuit, and
notify a pedestrian possessing the portable terminal of a message by an output device when the current position of the portable terminal corresponds to any one of the detected positions indicated in the position information included in the transmitted detection information.

(2) The notification system according to (1), wherein the processor of each portable terminal is further configured to transmit, in a case where a pedestrian possessing the portable terminal has responded to the message, response information indicating that the pedestrian has responded to the message to the detection device via the portable communication circuit.

(3) The notification system according to (1) or (2), wherein the detection information includes accuracy information indicating an accuracy of the position information.

(4) The notification system according to any one of (1) to (3), wherein the processor of the detection device in detecting the position of each pedestrian sets the target area to a shape along a scheduled travel route of the vehicle until a predetermined time elapses.

(5) A notification system including a detection device mounted on a vehicle, one or more portable terminals possessed by each of one or more pedestrians, and a server communicably connected to the detection device and the one or more portable terminals via a communication network, wherein:
the detection device comprises a processor configured to
detect a position of each pedestrian in a target area at a predetermined relative position with respect to the vehicle, and
transmit detection information including position information indicating the detected position to the server via a vehicle communication circuit,
each portable terminal comprises a processor configured to upload device position information including a current position of the portable terminal to the server via a portable communication circuit, and
the server comprises a processor configured to
receive the device position information uploaded from each portable terminal via a server communication circuit,
store the device position information in association with each portable terminal to a memory,
receive the detection information from the detection device via the server communication circuit, and
transmit notification information via the server communication circuit to the portable terminal corresponding to the detected position indicated by the position information included in the detection information received from the detection device,
wherein the processor of each portable terminal is further configured to
receive the notification information transmitted from the server via the portable communication circuit, and
in response to reception of the notification information, notify a pedestrian possessing the portable terminal via an output device.

(6) A notification method, comprising:
detecting a position of each one or more pedestrians in a target area at a predetermined position to a vehicle by a detection device mounted on the vehicle,
transmitting detection information including position information indicating the detected position to each of one or more portable terminals possessed by each of the one or more pedestrians by the detection device,
receiving the detection information transmitted from the detection device by each of the one or more portable terminals, and
notifying, by any one of the one or more portable terminals whose current position corresponds to any one of the detected positions indicated in the position information included in the transmitted detection information, a pedestrian possessing the portable terminal via a respective output device.

The notification system according to the present disclosure can appropriately notify a pedestrian present in a predetermined area around a vehicle of a message.

BRIEF DESCRIPTION OF THE DRAWINGS

FIG. 6 is a diagram illustrating an example of detection information.

DESCRIPTION OF EMBODIMENTS

Hereinafter, a notification system that can appropriately notify a pedestrian present in a predetermined area around a vehicle of a message will be described in detail with reference to the drawings. The notification system includes a detection device mounted on a vehicle and one or more portable terminals possessed by each of one or more pedestrians. The detection device detects the position of each pedestrian in a target area at a predetermined relative position to the vehicle, and transmits detection information including position information indicating the detected position to each of the one or more portable terminals. Each portable terminal receives the detection information transmitted from the detection device. When the current position of the portable terminal corresponds to any one of the detected positions indicated by the position information included in the transmitted detection information, each of the portable terminals notifies a pedestrian possessing the portable terminal of the message via the output device.

Figure 1:
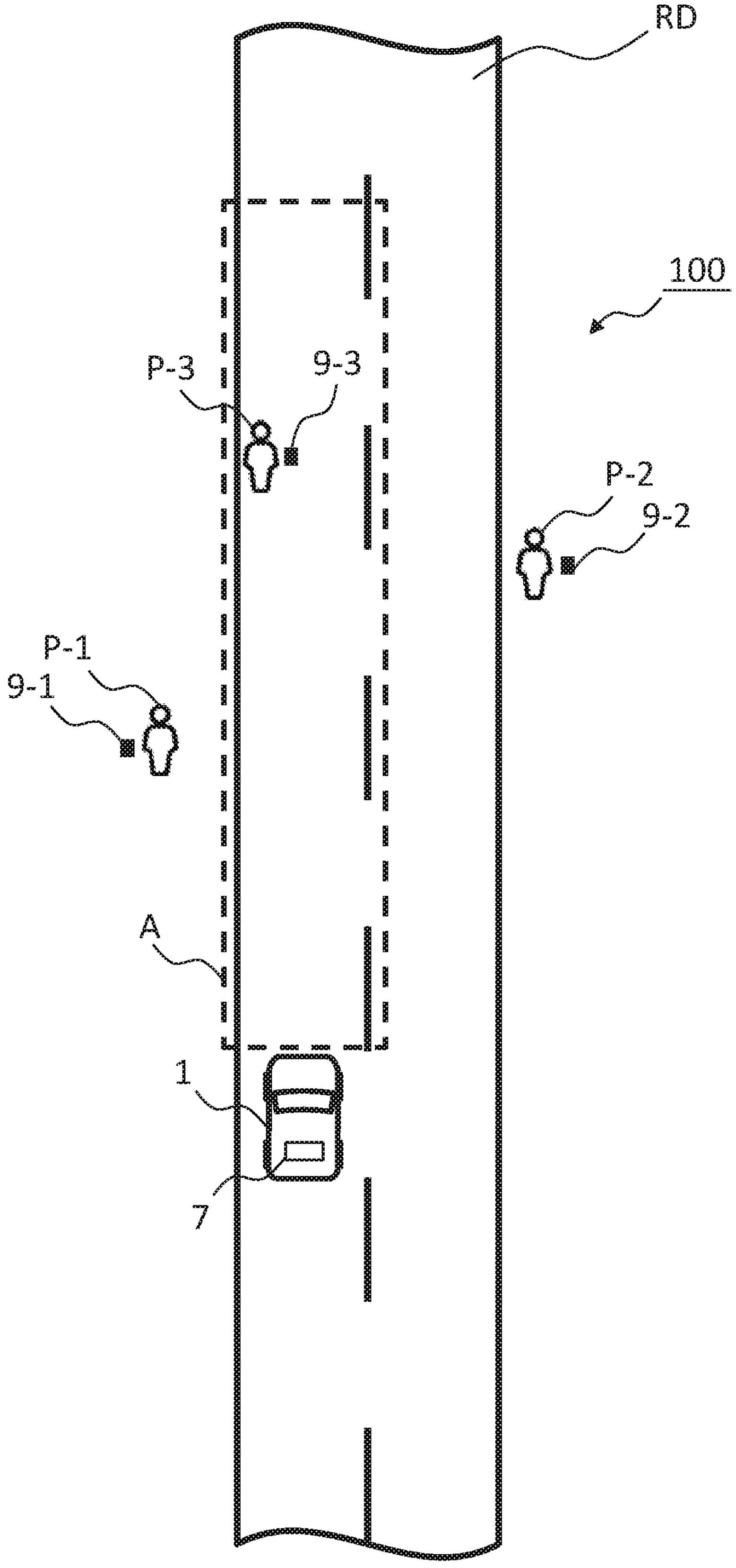
FIG. 1 is a diagram illustrating an outline of a notification system.
Figure 2:
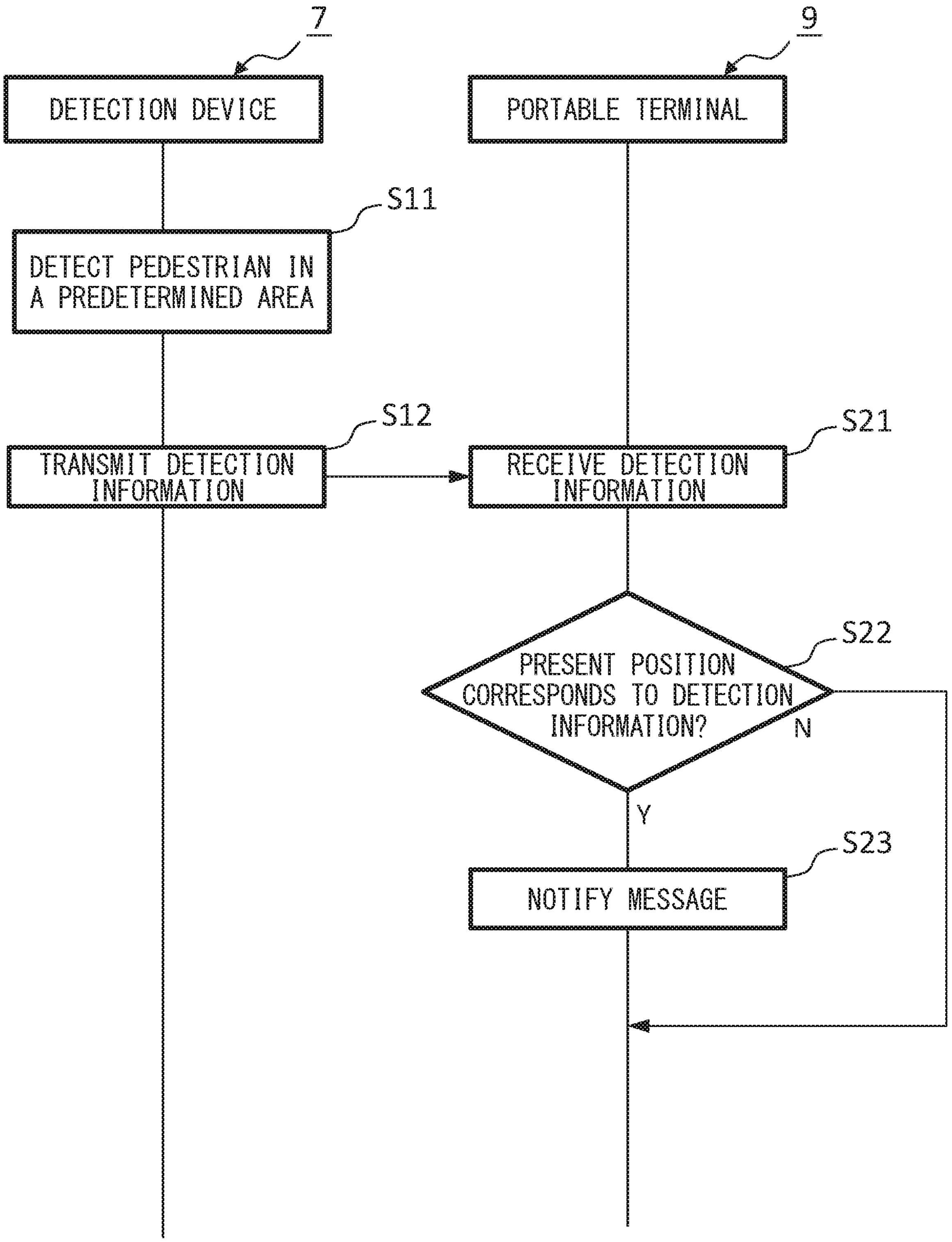
FIG. 2 is an operation sequence diagram of the notification system.

FIG. 1 is a diagram for explaining an outline of a notification system, and FIG. 2 is an operation sequence diagram of the notification system.

The notification system 100 includes a detection device 7 mounted on the vehicle 1 traveling on the road RD, and portable terminals 9-1 to 9-3 (hereinafter also referred to as "portable terminal 9") possessed by each of the pedestrian P-1 or P-3 (hereinafter also referred to as "pedestrian P") present in the vicinity of the vehicle 1. The detection device 7 can be implemented as, for example, a drive recorder that records a situation in the vicinity of the vehicle 1. The portable terminal 9 can be implemented as, for example, a smartphone possessed by the pedestrian P.

The detection device 7 detects the position of the pedestrian P-3 in the target area A ahead of the vehicle 1 (step S11), and transmits detection information including position information indicating the position of the pedestrian P-3 to the portable terminal 9 (each of the portable terminals 9-1 to 9-3) (step S12).

The portable terminal 9 receives the detection information (step S21). The portable terminal 9 determines whether or not the present position corresponds to the position information included in the received detected information (step S22). The present position of the portable terminal 9-3 corresponds to the position information included in the received detected information (step S22:Y). Therefore, the portable terminal 9-3 notifies the pedestrian P-3 possessing the portable terminal 9-3 of the message (step S23). On the other hand, the present positions of the portable terminals 9-1 and 9-2 do not correspond to the position information included in the received detected information (step S22:N). Therefore, the portable terminals 9-1 and 9-2 do not notify the pedestrians P-1 and P-2 possessing the respective devices.

Figure 3:
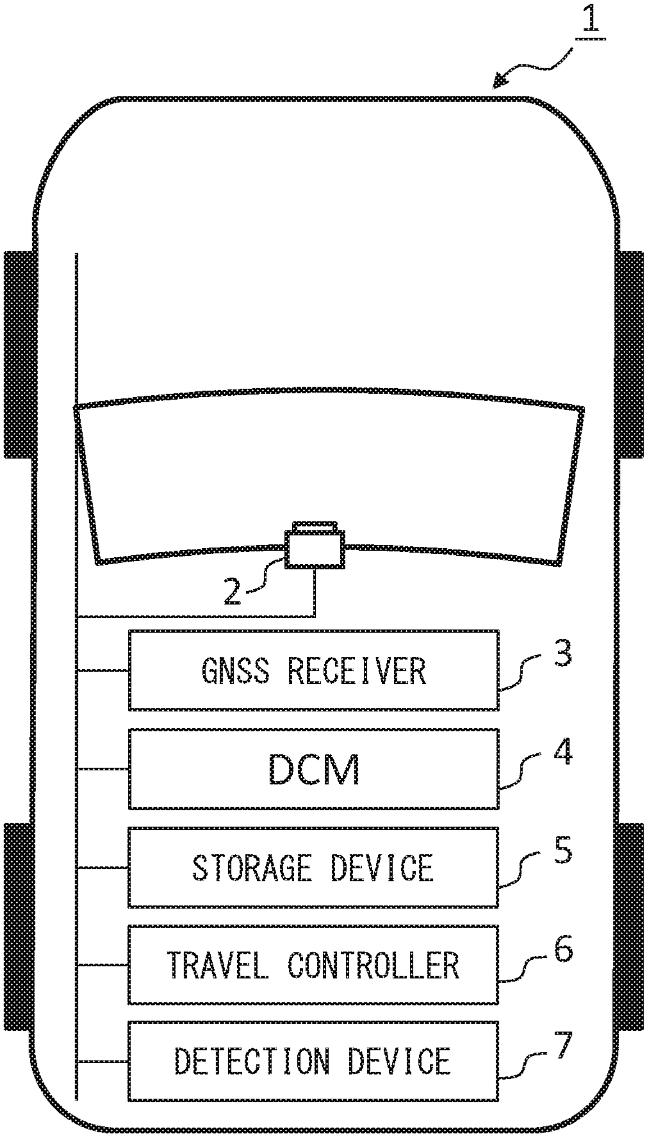
FIG. 3 schematically illustrates the configuration of a vehicle equipped with a detection device.

FIG. 3 schematically illustrates the configuration of the vehicle 1 equipped with the detection device 7.

The vehicle 1 includes an environmental camera 2, a GNSS (Global Navigation Satellite System) receiver 3, DCM (data communication module) 4, a storage device 5, a travel controller 6, and a detection device 7. The vehicle 1 is an autonomous vehicle that can travel under the control of the travel controller 6. The environmental camera 2, the GNSS receiver 3, the data communication module 4, the storage device 5, and the travel controller 6 and the detection device 7 are communicably connected via an in-vehicle network conforming to a standard such as a controller area network.

The environmental camera 2 is an example of an environmental sensor for generating environmental data representing a situation in the vicinity of the vehicle 1. The environmental camera 2 includes a two-dimensional detector including an array of photoelectric transducers sensitive to visible light, such as CCD or C-MOS, and an imaging optical system that forms an image of an area to be imaged on the two-dimensional detector. The environmental camera 2 is arranged in the front upper portion of the vehicle interior, for example, with its front facing, and captures a situation in the vicinity of the vehicle 1 via a windshield at predetermined capturing cycles (for example, 1/30 second to 1/10 second), and outputs an environmental image as environmental data representing a situation in the vicinity of the vehicle 1. Note that the vehicle 1 may include a sensor other than the environmental camera 2 as an environmental sensor, for example, a LiDAR (Light Detection And Ranging) sensor that generates, as peripheral data, a distance image in which each pixel has a value corresponding to a distance to an object represented by the pixel based on a state in the vicinity of the vehicle 1.

The GNSS receiver 3 is an example of a vehicle positioning sensor, and receives GNSS signals from GNSS satellites at predetermined intervals, and measures the position of the vehicle 1, based on the received GNSS signals. The GNSS receiver 3 outputs, at predetermined intervals, a positioning signal representing a positioning result of the self-position of the vehicle 1 based on GNSS signal to the travel controller 6 and the detection device 7 via the in-vehicle network.

The data communication module 4 is an example of a vehicle communication unit, and is a device including communication circuitry for executing a wireless communication process compliant with a wireless communication standard such as Bluetooth Low Energy, V2X (Vehicle to X). The data communication module 4 can, for example, act as a broadcaster in Bluetooth Low Energy communications and transmit data received from the detection device 7 in an advertising packet. The data communication module 4 may be implemented as part of the detection device 7.

The data communication module 4 may further perform a wireless communication process compliant with a wide area wireless communication standard such as 4G (4th Generation) or 5G (5th Generation). The data communication module 4 may transmit the data received from the detection device 7 in an uplink radio signal. In addition, the data communication module 4 can pass the data included in the received wireless signal to the detection device 7.

The storage device 5 is an example of a vehicle storage unit, and includes, for example, a hard disk device or a non-volatile semiconductor memory. The storage device 5 stores a high-precision map which includes, for example, information representing a lane division line that divides a lane in a predetermined region represented in the high-precision map.

The travel controller 6 is a ECU (Electronic Control Unit) including a communication interface, a memory, and a processor. The travel controller 6 reads the lane lines in the vicinity of the vehicle position represented by the positioning signal received from the GNSS receiver 3 from the storage device 5 that stores the high-precision maps.

The travel controller 6 inputs the environmental image received from the environmental camera 2 to a discriminator trained in advance so as to detect the lane line from the image, thereby detecting the lane lines in the vicinity from the environmental data.

The classifier may be, for example, a convolutional neural network (CNN) having a plurality of convolutional layers connected in series from an input-side to an output-side. By using the image including the lane line as the training data and training CNN in advance according to a predetermined training technique such as backpropagation, CNN operates as a classifier for detecting the lane line from the environmental image.

The travel controller 6 identifies the lane on which the vehicle 1 is traveling by comparing the lane division line detected from the environmental image with the lane line in the high-precision map. The travel controller 6 outputs a control signal to a traveling mechanism (not shown) of the vehicle 1 so as to travel at a target speed set in advance on a planned traveling route along a lane in which the vehicle 1 is currently traveling. The traveling mechanism includes, for example, an engine or a motor for powering the vehicle 1, an accelerator for adjusting acceleration of the vehicle 1, a brake for decelerating the vehicle 1, and a steering mechanism for steering the vehicle 1.

Figure 4:
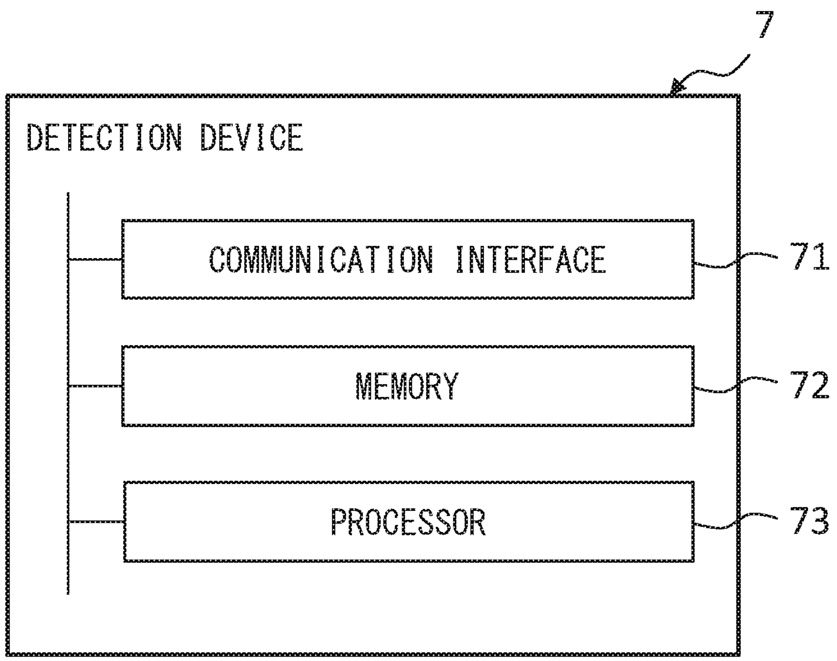
FIG. 4 is a schematic hardware diagram of the detection device.

FIG. 4 is a schematic hardware diagram of the detection device 7. The detection device 7 detects a pedestrian present in the vicinity of the vehicle 1 from the peripheral image received from the peripheral camera 2. To this end, the detection device 7 includes a communication interface 71, a memory 72, and a processor 73.

The communication interface 71 has a communication interface circuit for connecting the detection device 7 to the in-vehicle network. The communication interface 71 supplies the received data to the processor 73 and outputs the data supplied from the processor 73 to the outside.

The memory 72 is another example of the vehicle storage unit, and includes a volatile semiconductor memory and a non-volatile semiconductor memory. The memory 72 stores various types of data used for processing by the processor 73, for example, area definition information for specifying a target area corresponding to a range of a position of a pedestrian to be detected. The memory 72 further stores photographing parameters such as a focal length, a photographing direction, and a pixel size of the optical system of the environmental camera 2 as various types of data. The memory 72 further stores, for example, a set of parameters for defining a CNN that operates as a classifier for detecting an area representing a pedestrian from environmental images (e.g. the number of layers, the layer structure, the kernels, and the weighting factors). The memory 72 additionally stores the standard size of the pedestrian, as well as various application programs, such as a detection program for executing a detection process.

The processor 73, which is an example of a vehicle control unit, includes one or more processors and peripheral circuits thereof. The processor 73 may further include other arithmetic circuits such as a logical operation unit, a numerical operation unit, or a graphics processing unit.

Figure 5:
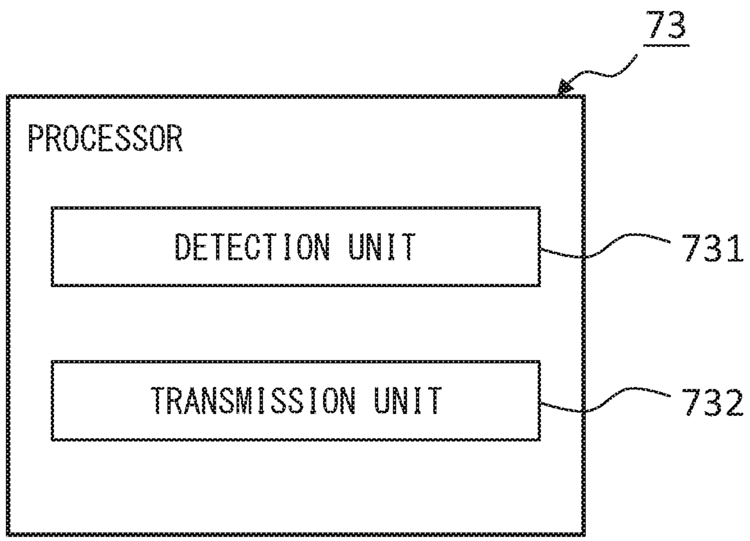
FIG. 5 is a functional block diagram of a processor included in the detection device.

FIG. 5 is a functional block diagram of the processor 73 included in the detection device 7.

The processor 73 of the detection device 7 includes a detection unit 731 and a transmission unit 732 as its functional blocks.

These units included in the processor 73 are functional modules implemented by a computer program stored in the memory 72 and executed by the processor 73. The computer program for achieving the functions of the respective units of the processor 73 may be provided in a form recorded on a computer-readable portable recording medium, such as a semiconductor memory, a magnetic recording medium, or an optical recording medium. Alternatively, these units included in the processor 73 may be implemented in the detection device 7 as separate integrated circuits, microprocessors, or firmware.

The detection unit 731 detects the position of each pedestrian in an area located at a predetermined relative position to the vehicle 1.

The detection unit 731 inputs a peripheral image acquired from the peripheral camera 2 to a classifier trained in advance so as to detect, for example, a feature including a lane line and a pedestrian from an image, thereby specifying a type of the feature and an area where the feature including the lane line and the pedestrian are represented in the peripheral image.

When the peripheral sensor is a LiDAR sensor, the detection unit 731 may specify an area representing the pedestrian in the distance image acquired from LiDAR sensor, for example, by inputting to a classifier trained in advance so as to detect the pedestrian from the distance image.

The detection unit 731 reads, from the storage device 5 that stores the high-precision maps, the information of the lane lines in the vicinity of the vehicle position representing the positioning signal received from the GNSS receiver 3, and estimates the position and the traveling direction of the vehicle 1 at the time when the environmental data is generated by comparing the position of the lane line detected from the environmental data with the position of the lane line read from the storage device 5. The detection unit 731 may acquire the position and the traveling direction of the vehicle 1 from the travel controller 6, or may specify the position and the traveling direction by the own vehicle position represented by the positioning signal received from GNSS receiver and the direction information acquired from a direction sensor (not shown) mounted on the vehicle 1.

The detection unit 731 estimates the direction in which the pedestrian is present with respect to the vehicle 1 by using the position of the region in which the pedestrian is represented in the environmental data and the photographing parameter of the environmental camera 2 stored in the memory 72.

The detection unit 731 estimates the distance of the pedestrian from the vehicle 1 by using the size of the region represented by the pedestrian in the environmental data and the standard size of the pedestrian stored in the memory 72.

The detection unit 731 obtains the position of the pedestrian in the world coordinate system at the time of generation of the environmental image by using the position and the traveling direction of the vehicle 1, the direction in which the pedestrian is facing with respect to the vehicle 1, and the distance of the pedestrian from the vehicle 1.

The detection unit 731 compares the position of the pedestrian in the world coordinate system represented in the peripheral image with the target area A specified by the area definition information stored in the memory 72, and detects the pedestrian located in the target area A.

The target area A is set based on predetermined area definition information. The target area A is, for example, a rectangular area from the front end of the vehicle 1 to 20 m away in the vertical direction and from the left end in 1 m of the left end to the right end of the vehicle 1 in the horizontal direction.

In addition, the target area A may have a shape along the scheduled traveling route of the vehicle 1 from the current time to a predetermined time (for example, 2 seconds). Accordingly, when the vehicle 1 is traveling on a straight road, the target area A is a rectangular area.

When the vehicle 1 is traveling on a curved road, the target area A has a curved shape. When the vehicle 1 is scheduled to turn right or left at the intersection, the target area A has a shape corresponding to a traveling scheduled route that turns right or left. The detection unit 731 acquires, from the travel controller 6, a travel scheduled route of the vehicle 1 from the current time to a predetermined time.

The length of the target area A in the front-rear direction may vary depending on the speed of the vehicle 1. For example, when the vehicle 1 is traveling at a high speed, since the position after a predetermined time of the vehicle 1 is farther than when traveling at a low speed, the longitudinal length of the target area may be longer than when traveling at a low speed. In addition, the target area A may be set at the rear of the vehicle 1 when the vehicle 1 is traveling backward.

The transmission unit 732 transmits detection information including position information indicating the position of the pedestrian detected in the target area A in the world coordinate system to each of the one or more portable terminals 9 carried by each of the one or more pedestrians located in the vicinity of the vehicle 1.

The transmission unit 732 outputs detection information to the data communication module 4, and causes the data communication module 4 to transmit signal including the detection information, for example, an advertising packet in Bluetooth Low Energy communication. At this time, the portable terminal 9 operates as an observer in Bluetooth Low Energy communication, and receives the detection information by scanning an advertising packet transmitted from the data communication module 4. The transmission unit 732 may cause the data communication module 4 to transmit the detection information by wireless communication processing conforming to the wide area wireless communication standard.

The detection information may include accuracy information indicating the probability of the position information. The accuracy is determined according to, for example, the type and the number of GNSS satellites corresponding to the radio waves received by the GNSS receiver 3 at the generation of the positioning signal of the vehicle 1.

FIG. 6 is a diagram illustrating an example of the detection information.

In the detection information 821, for each of the detected moving objects, an identifier (ID) for identifying the object, position information representing latitude and longitude of the object, and accuracy information representing the accuracy of the position information indicated by an error (m) in the position of the object are associated with each other.

Figure 7:
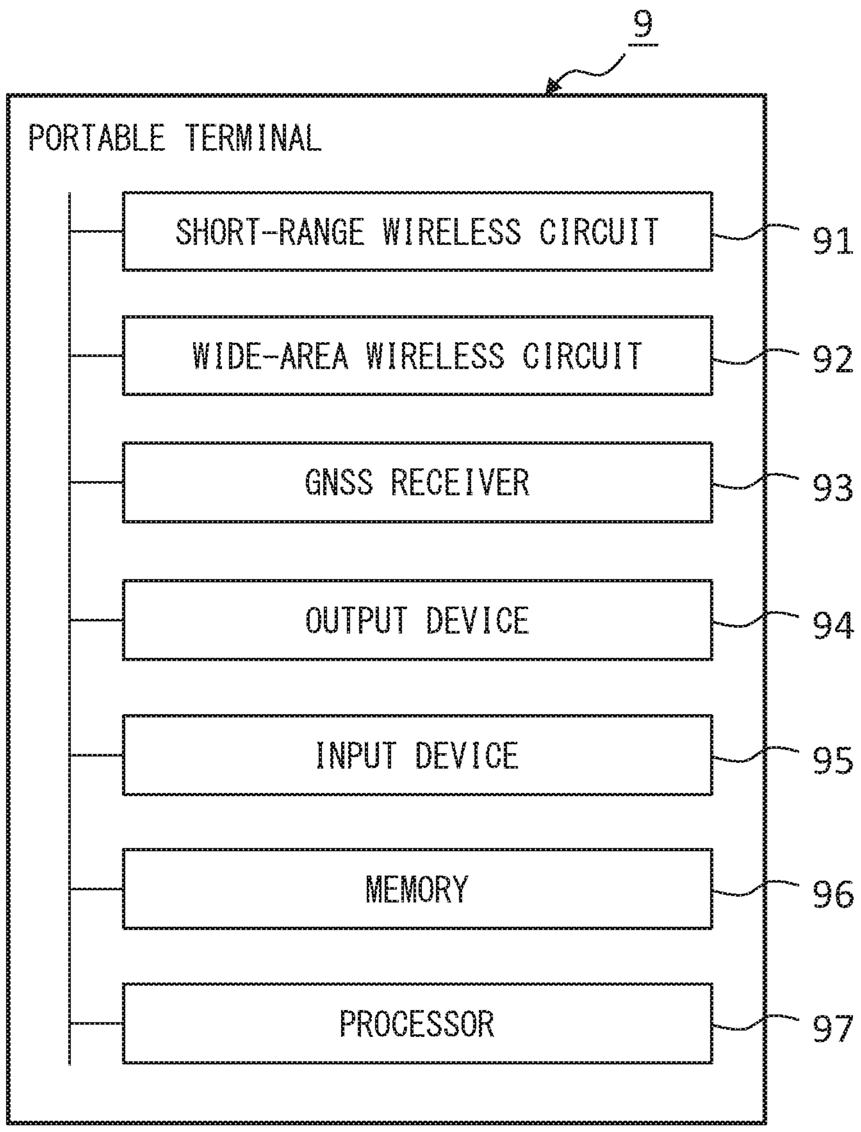
FIG. 7 is a schematic hardware diagram of a portable terminal.

FIG. 7 is a schematic hardware diagram of the portable terminal 9. The portable terminal 9 includes a short-range wireless circuit 91, a wide-area wireless circuit 92, a GNSS receiver 93, an output device 94, an input device 95, a memory 96, and a processor 97.

The short-range wireless circuit 91 is an example of a portable communication unit, and includes a communication circuit and an antenna for wirelessly transmitting and receiving data between the portable terminal 9 and a device at a relatively short distance. The short-range wireless circuit 91 supplies the received data to the processor 97. The short-range wireless circuit 91 also transmits the data supplied from the processor 97 to the outside, being a circuit for wireless communication conforming to a standard, such as Bluetooth Low Energy, NFC (Near Field Communication), and IEEE 802.11.

The wide-area wireless circuit 92 is another example of the portable communication unit, and includes a communication circuit and an antenna for the portable terminal 9 to perform wide-area wireless communication. The wide-area wireless circuit 92 is, for example, a circuit for transmitting and receiving data to and from a wireless base station included in a communication network. The wide-area wireless circuit 92 supplies the received data to the processor 97, and transmits the data supplied from the processor 97 to the wireless base station.

The GNSS receiver 93, which is an example of a mobile positioning sensor, receives GNSS signals from GNSS satellites at predetermined intervals, and measures the position of the portable terminal 9 based on the received GNSS signals. The GNSS receiver 93 outputs, to the processor 97, a positioning signal representing the positioning of the portable terminal 9 based on GNSS signal at each predetermined cycle.

The output device 94, which is an example of a portable output unit, performs output to a pedestrian possessing the portable terminal 9. The output device 94 includes, for example, a device such as a display or a speaker. The display is a device for displaying images, such as a liquid crystal display or an organic electroluminescent display. The display displays an image corresponding to the image data received from the processor 97. The speaker is a device that outputs sound. The output device 94 outputs images, sounds, or the like in accordance with a signal generated by the processor 97. The output device 94 may include a light source that emits light in a predetermined pattern or a vibrator that vibrates in a predetermined pattern in accordance with a signal generated by the processor 97.

The input device 95, which is an example of a portable input unit, receives an operation by a pedestrian possessing the portable terminal 9. The input device 95 includes, for example, a device such as a touch panel layered on a display and a microphone that receives sound. The input device 95 generates a signal corresponding to the received operation, and outputs the signal to the processor 97.

The memory 96, which is an example of a portable storage unit, includes a volatile semiconductor memory and a non-volatile semiconductor memory. The memory 96 stores various types of data used for processing by the processor 97, for example, message information representing the contents of a message notified to a pedestrian possessing the portable terminal 9. The message information is, for example, voice information indicating a voice such as "A vehicle is approaching. Please be careful", voice information indicating an alarm sound, character information indicating a text such as "A vehicle is approaching. Please be careful." The memory 96 temporarily stores the detection information 821 received from the detection device 7. The memory 72 stores various application programs, for example, a notification program for a executing a detection method.

The processor 97, which is an example of a portable control unit, includes one or more processors and peripheral circuits thereof. The processor 97 may further include other arithmetic circuits such as a logical operation unit, a numerical operation unit, or a graphics processing unit.

Figure 8:
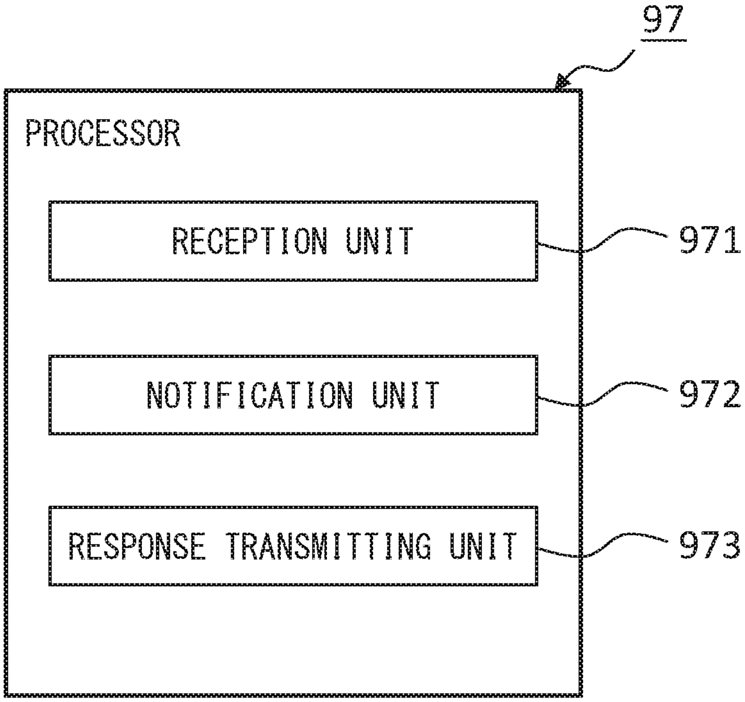
FIG. 8 is a functional block diagram of a processor included in the portable terminal.

FIG. 8 is a functional block diagram of the processor 97 included in the portable terminal 9. The processor 97 of the portable terminal 9 includes a reception unit 971, a notification unit 972, and a response transmitting unit 973 as functional blocks.

Each of these units included in the processor 97 is a functional module that is implemented by a computer program stored in the memory 96 and executed on the processor 97. The computer program for achieving the functions of the respective units of the processor 97 may be provided in a form recorded in a computer-readable portable recording medium, such as a semiconductor memory, a magnetic recording medium, or an optical recording medium. Alternatively, these units included in the processor 97 may be implemented in the portable terminal 9 as independent integrated circuits, microprocessors, or firmware.

The reception unit 971 receives the detection information transmitted from the detection device 7 via the short-range wireless circuit 91. As described above with respect to the transmission unit 732 of the detection device 7, communication between the short-range wireless circuit 91 and the detection device 7 is performed using a broadcast communication technique. When Bluetooth Low Energy communication is used as a broadcast communication technique, for example, the short-range wireless circuit 91 operates as an observer in Bluetooth Low Energy communication, and can receive detection information by scanning advertising packets periodically transmitted at predetermined intervals from the detection device 7 operating as a broadcaster.

The notification unit 972 receives the positioning signal from the GNSS receiver 93 at predetermined intervals and identifies the position of the portable terminal 9 represented by the positioning signal. Further, the notification unit 972 determines whether or not the identified position of the portable terminal 9 corresponds to any one of the positions indicated in the position information included in the received detection information. When the identified position of the portable terminal 9 corresponds to any one of the positions indicated in the position information included in the received detection information, the notification unit 972 notifies the pedestrian possessing the portable terminal 9 of the message via the output device 94.

The notification unit 972 determines whether or not the identified position of the portable terminal 9 corresponds to the position information associated with the moving object for each moving object included in the received detection information. When the position of the identified portable terminal 9 is included in the range of the distance indicated by the accuracy information associated with the moving object from the position indicated by the position information associated with any of the moving objects included in the received detection information, the notification unit 972 determines that the identified position of the portable terminal 9 corresponds to any one of the positions indicated by the position information included in the received detection information.

When it is determined that the identified position of the portable terminal 9 corresponds to any one of the positions indicated by the position information included in the received detection information, the notification unit 972 outputs the message information stored in the memory 96 to the output device 94 and notifies the pedestrian possessing the portable terminal 9.

When receiving a response to a message from a pedestrian possessing the portable terminal 9, the response transmitting unit 973 transmits response information indicating that a response has been made by the pedestrian to the detection device 7 via the short-range wireless circuit 91. The short-range wireless circuit 91 may transmit the response-information to the detection device 7, for example, by Bluetooth Low Energy communication.

The response transmitting unit 973 may receive a response to the message by the pedestrian by detecting a touch of the pedestrian with respect to an area of the message displayed on the display by the input device 95 which is, for example, a touch panel layered on the display. The response transmitting unit 973 may receive a response to the message of the pedestrian by receiving a voice response (e.g., "OK") from the pedestrian to the message by the input device 95 which is, for example, a microphone.

Note that the reception unit 971 may receive the detection information transmitted from the detection device 7 via the wide-area wireless circuit 92. The response transmitting unit 973 may transmit the response information to the detection device 7 via the wide-area wireless circuit 92.

The detection device 7 compares the number of pieces of position information included in the detection information with the number of pieces of response information received from the portable terminal 9. When the number of received response information is less than the number of pieces of position information included in the detection information, the detection device 7 transmits, to the travel controller 6, a safety travel request signal requesting that the travel of the vehicle 1 be more carefully controlled, such as making the distance to the surrounding object longer or making the travel speed slower.

By configuring the detection device 7 and the portable terminal 9 as described above, the notification system 100 can appropriately notify the pedestrian present in the predetermined area around the vehicle of the message.

The notification system 100 can selectively transmit a message to a pedestrian present in a predetermined area around the vehicle without specifying a pedestrian or a portable terminal possessed by the pedestrian. Therefore, the notification system 100 can appropriately notify a pedestrian of the message while appropriately protecting the privacy of the pedestrian.

Figure 9:
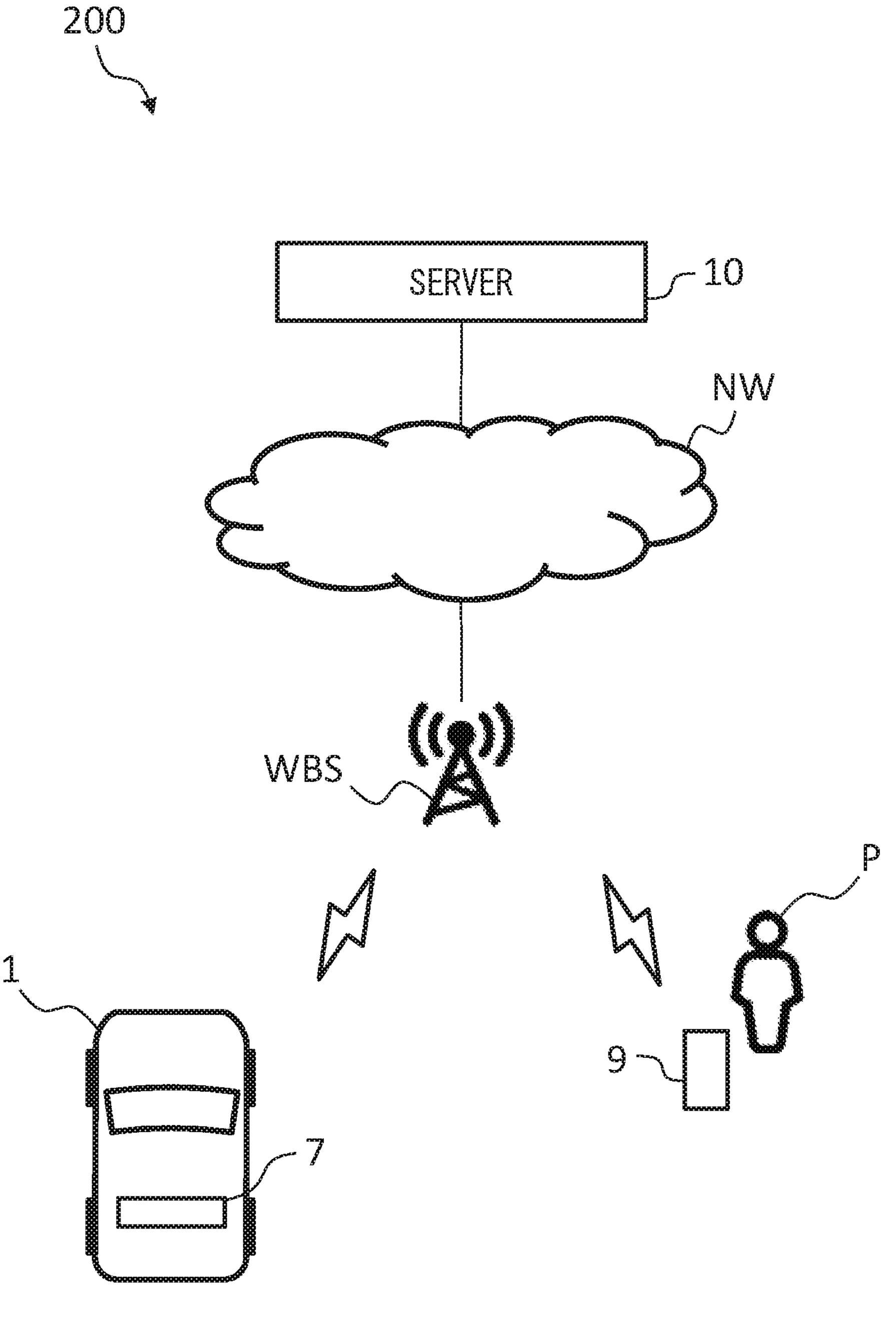
FIG. 9 is a diagram for explaining an outline of a notification system according to an alternative embodiment.
Figure 10:
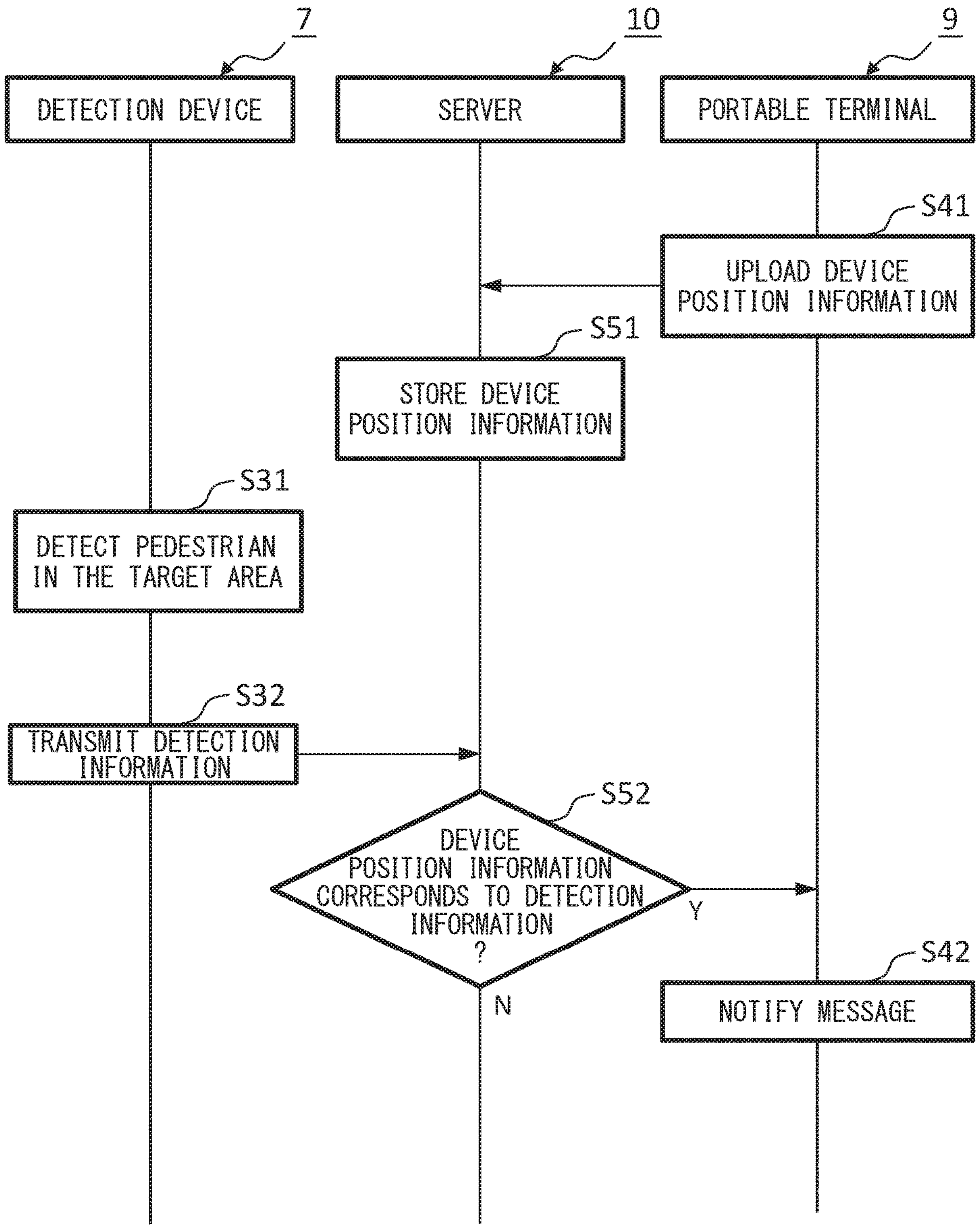
FIG. 10 is an operation sequence diagram of a notification system according to the alternative embodiment.

FIG. 9 is a diagram for explaining an outline of a notification system according to an alternative embodiment, and FIG. 10 is an operation sequence diagram of the notification system according to the alternative embodiment.

The notification system 200 includes a detection device 7 mounted on the vehicle 1, one or more portable terminals 9 each possessed by one or more pedestrians P present in the vicinity of the vehicle 1, and a server 10 communicably connected to the communication networking NW. The server 10 includes a communication circuit (an example of a server communication unit, not shown), a memory (an example of a server storage unit, not shown), and a processor (not shown). The detection device 7 can communicate with the server 10 via the data communication module 4 and the wireless base station WBS included in the communication network NW. The portable terminal 9 can communicate with the server 10 via the wide-area wireless circuitry 92 and the wireless base station WBS included in the communication networking NW.

The processor 97 of the portable terminal 9 further includes an upload unit (not shown) as a functional block. The upload unit uploads the device position information to the server 10 periodically (for example, every other minute) via the wide-area wireless circuit 92 (step S41).

The processor of the server 10 includes a position registration unit (not shown) as a functional block. The position registration unit receives the device position information from the portable terminal 9 via the communication interface, and stores the present position of the portable terminal in the memory in association with the portable terminals (step S51).

The detection unit 731 of the detection device 7 detects the position of the pedestrian P in the target area A (step S31). The transmission unit 732 of the detection device 7 transmits detection information including position information indicating the position of the pedestrian P to the server 10 via the data communication module 4 and the wireless base station WBS included in the communication network NW (step S32).

The processor of the server 10 further includes a notification transmitting unit (not shown) as a functional block. The notification transmitting unit receives the detection information from the detection device via the communication circuitry, and determines whether each of the present positions of the portable terminals stored in the memory corresponds to the detected position indicated by the position information included in the detection information received from the detection device (step S52). The notification transmitting unit transmits notification information to the portable terminal determined to correspond to the position at which the present position is detected among the portable terminals via the communication circuit (step S52: Y). The notification information is information indicating that the portable terminal to be transmitted should give a predetermined notification to the pedestrian possessing the portable terminal. In addition, the notification transmitting unit does not transmit the notification to the portable terminal associated with the present position that is not determined to correspond to the detected position (step S52:N).

Among the portable terminals, the portable terminal 9 that has received the notification information notifies the pedestrian possessing the portable terminal 9 of the message via the output device 94 (step S42).

Such a process of the detection device 7, the portable terminal 9, and the server 10 enables the notification system 200 appropriately notify the pedestrian present in the predetermined area around the vehicle of the message.

It should be noted that those skilled in the art apply various changes, substitutes, and modifications without departing from the spirit and scope of the present disclosure.

What is claimed is:

1. A notification system including a detection device mounted on a vehicle and one or more portable terminals possessed by each of one or more pedestrians, wherein the detection device comprises a first processor configured to:

detect a position of each pedestrian that is located in a target area at a predetermined position relative to the vehicle, and transmit detection information including position information indicating one or more detected positions of each of the one or more pedestrians that were detected to be located in the target area to each of the one or more portable terminals via a vehicle communication circuit, each of the one or more portable terminals comprises a second processor configured to:

receive the detection information transmitted from the vehicle communication circuit via a portable communication circuit, and (i) notify a pedestrian possessing the portable terminal of a message via an output device when a current position of the portable terminal corresponds to any of the one or more detected positions indicated in the position information included in the detection information received from the vehicle communication circuit, and (ii) not notify the pedestrian possessing the portable terminal of the message when the current position of the portable terminal does not correspond to any of the one or more detected positions indicated in the position information included in the detection information received from the vehicle communication circuit.

2. The notification system of claim 1, wherein the second processor of each of the one or more portable terminals is further configured to transmit, in a case where the pedestrian possessing the portable terminal has responded to the message, response information indicating that the pedestrian has responded to the message to the detection device via the portable communication circuit.

3. The notification system according to claim 1, wherein the detection information includes accuracy information indicating an accuracy of the position information.

4. The notification system according to claim 1, wherein the first processor of the detection device in detecting the position of each pedestrian sets the target area to a shape along a scheduled travel route of the vehicle until a predetermined time elapses.

5. A notification system including a detection device mounted on a vehicle, one or more portable terminals possessed by each of one or more pedestrians, and a server communicably connected to the detection device and to the one or more portable terminals via a communication network, wherein:

the detection device comprises a first processor configured to detect a position of each pedestrian that is located in a target area at a predetermined position relative to the vehicle, and transmit detection information including position information indicating one or more detected positions of each of the one or more pedestrians that were detected to be located in the target area to the server via a vehicle communication circuit, each of the one or more portable terminals comprises a second processor configured to upload device position information including a current position of the portable terminal to the server via a portable communication circuit, and the server comprises a third processor configured to receive the device position information uploaded from each of the one or more portable terminals via a server communication circuit, store the device position information in association with each of the one or more portable terminals to a memory, receive the detection information transmitted from the vehicle communication circuit via the server communication circuit, and transmit notification information via the server communication circuit to any of the one or more portable corresponding terminals whose device position information stored in the memory corresponds to any of the one or more detected positions indicated in the position information included in the detection information received from the vehicle communication circuit, wherein the second processor of each of the one or more portable terminals is further configured to receive the notification information transmitted from the server via the portable communication circuit, and in response to reception of the notification information, notify a pedestrian possessing the portable terminal via an output device.

6. A notification method, comprising:

detecting a position of each of one or more pedestrians located in a target area at a predetermined position relative to a vehicle by a detection device mounted on the vehicle, transmitting detection information including position information indicating one or more detected positions of each of the one or more pedestrians that were detected by the detection device to be located in the target area to each of one or more portable terminals possessed by each of the one or more pedestrians by a vehicle communication circuit of the vehicle, receiving the detection information transmitted from the vehicle communication circuit by a portable communication circuit of each of the one or more portable terminals, and (i) notifying a pedestrian possessing any of the one or more portable terminals whose current position corresponds to any of the one or more detected positions indicated in the position information included in the detection information received from the vehicle communication circuit, via a respective output device of the portable terminal, and (ii) not notifying the pedestrian possessing any of the one or more portable terminals whose current position does not correspond to any of the one or more detected positions indicated in the position information included in the detection information received from the vehicle communication circuit, via the respective output device of the portable terminal.

* * * * *